United States Patent
Liu et al.

(10) Patent No.: US 8,275,142 B2
(45) Date of Patent: Sep. 25, 2012

(54) ACOUSTIC ECHO CANCELLATION SYSTEM

(75) Inventors: Qing-Guang Liu, Sunnyvale, CA (US); Wilson Or, Belmont, CA (US)

(73) Assignees: Fortemedia, Inc., Cupertino, CA (US); Maxsonics, Inc., Santa Clara, CA (US)

( * ) Notice: Subject to any disclaimer, the term of this patent is extended or adjusted under 35 U.S.C. 154(b) by 1237 days.

(21) Appl. No.: 12/044,048

(22) Filed: Mar. 7, 2008

(65) Prior Publication Data

US 2008/0219463 A1     Sep. 11, 2008

Related U.S. Application Data

(60) Provisional application No. 60/906,133, filed on Mar. 9, 2007.

(51) Int. Cl.
- H03B 29/00 (2006.01)
- H04B 3/20 (2006.01)
- H04B 15/00 (2006.01)
- H04M 9/08 (2006.01)

(52) U.S. Cl. ..... 381/71.11; 381/71.1; 381/66; 381/94.1; 379/406.01; 379/406.07; 379/406.08; 379/406.09

(58) Field of Classification Search ............. 381/66, 381/94.1–94.9, 71.11, 71.12; 379/406.01, 379/406.07, 406.06, 406.09

See application file for complete search history.

(56) References Cited

U.S. PATENT DOCUMENTS

| | | | | |
|---|---|---|---|---|
| 5,631,899 | A | * | 5/1997 | Duttweiler .............. 370/291 |
| 5,663,955 | A | | 9/1997 | Lyengar |
| 5,777,913 | A | | 7/1998 | Rasmusson |
| 2006/0034355 | A1 | | 2/2006 | Auvray et al. |

* cited by examiner

*Primary Examiner* — Devona Faulk

(74) *Attorney, Agent, or Firm* — Thomas|Kayden

(57) ABSTRACT

An embodiment of an acoustic echo cancellation system is disclosed. The system comprises an echo cancellation unit, a second filter and a subtraction unit. The echo cancellation unit comprises a first attenuator, a first filter and a first subtractor. The first attenuator has a first down-scaling factor for attenuating a first signal. The first filter generates a first echo signal estimate based on the attenuated first signal. The first subtractor generates a third signal by subtracting the first echo signal estimate from a second signal. The second filter generates a second echo signal estimate based on the first signal. The subtraction unit subtracts the second echo signal estimate from the third signal.

15 Claims, 6 Drawing Sheets

ACOUSTIC ECHO CANCELLATION SYSTEM

CROSS REFERENCE TO RELATED APPLICATIONS

This application claims the benefit of U.S. Provisional Application No. 60/906,133, filed Mar. 9, 2007.

BACKGROUND OF THE INVENTION

1. Field of the Invention

The invention relates to echo cancellation system, and more particularly to an acoustic echo cancellation system with two or more adaptive filters and one or more attenuators.

2. Description of the Related Art

FIG. 1 shows a block diagram of a conventional system for implementing Acoustic Echo Cancellation (AEC). A received signal x(n) is supplied via the input 101, and, in turn, transmitted to a loudspeaker 104 and filter 103. The filter 103 generates a simulated echo signal z(n) to remove unwanted portions from the signal y(n). In practice, a microphone 105 picks up desired acoustic signals, and also unavoidably picks up undesired audio output signals from the loudspeaker 104 which is called the acoustic echo. Typically, the audio signal picked up by microphone 105 has two acoustic echo components, one component is from the direct acoustic echo path (DEP) between a loudspeaker 104 and the microphone 105 and the other is from the reflective acoustic echo path (REP) reflected by walls or objects. The filter 103 plays the key role in removal of echo components in acoustic echo cancellation; its performance affects the effectiveness of acoustic echo cancellation.

Compared to telephone network echo paths, acoustic echo paths have certain distinctively different characteristics. For example, acoustic echo paths often have longer spans, varying impulse responses with time, and much less attenuated echo returns. Thus, adopting a network echo canceller to perform acoustic echo control is unsuitable. Due to the distinctively different characteristics of acoustic echo paths, AEC designs are generally more complicated and implementation more costly. For a typical hand-free voice terminal application in a conference room, the acoustical echo path span can easily be a few hundred milliseconds. When using the FIR filter 103 in FIG. 1 to replicate echo path response, more than a thousand taps are required for the narrowband digital speech signal sampled at 8 kHz, and a few thousands taps are required in wideband applications where the sampling rate is 16 kHz or higher.

Due to cost sensitivities, most applications in industrial and commercial products use integer fixed-point processors rather than the more expensive floating-point processors. Digital speech data are commonly sampled to be 16 bit 2's complement integer, and Acoustic Echo Canceller implementations are commonly done with fixed-point digital signal processors (DSP) that typically have 16-bit data word length and 40-bit integer multiply-accumulator. When two 16-bit integer data undergo integer multiplication, a 32-bit integer product is formed. Meanwhile, with 8 guard bits in a 40-bit accumulator, in the worst case a total of 256 multiply-accumulate operations can be done before saturation could occur.

Multiply-accumulation is an essential operation of FIR filtering. If the filter length N is large such as in the case needed to represent the estimated acoustic echo path impulse response, the sum-of-product operations may exceed 40 bits often. The limited accumulator length of the fixed-point processor will prevent the real acoustic impulse response from being represented digitally with sufficient precision. This is especially true when the received input signal has a higher signal level, then there will be fewer number of bits available for the FIR filter coefficients in order to avoid saturation in the multiply-accumulate operations. In the case of saturation happening or lacking of sufficient bit precision for filter coefficient representation, acoustic echo cancellation performance is adversely affected. Therefore the conventional ways of implementing adaptive FIR filter on fixed-point processors often experience degraded performance when used in acoustic echo cancellation applications.

BRIEF SUMMARY OF THE INVENTION

An embodiment of an acoustic echo cancellation system is disclosed. The system comprises an echo cancellation unit, a second filter and a subtraction unit. The echo cancellation unit comprises a first attenuator, a first filter and a first subtractor. The first attenuator has a first down-scaling factor for attenuating a first signal. The first filter generates a first echo signal estimate based on the attenuated first signal. A third signal is generated by subtracting the first echo signal estimate from a second signal in the first subtractor. The second filter generates a second echo signal estimate based on the first signal. The subtraction unit subtracts the second echo signal estimate from the third signal.

An embodiment of an apparatus with an acoustic echo cancellation system is disclosed. The apparatus comprises a loudspeaker, a microphone, an echo cancellation unit, a second filter and a subtraction unit. The loudspeaker receives and plays a first signal. The microphone acquires a second signal. The echo cancellation unit comprises a first attenuator, a first filter and a first subtractor. The first attenuator has a first down-scaling factor for attenuating a first signal. The first filter generates a first echo signal estimate based on the attenuated first signal. A third signal is generated by subtracting the first echo signal estimate from a second signal in the first subtractor. The second filter generates a second echo signal estimate based on the first signal. The subtraction unit subtracts the second echo signal estimate from the third signal.

An embodiment of an acoustic echo cancellation method comprises: receiving a first signal and a second signal; attenuating the first signal and generating a first echo signal estimate based on the attenuated first signal; subtracting the first echo signal estimate from the second signal to generate a third signal; generating a second echo signal estimate based on the first signal; subtracting the second echo signal estimate from the third signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
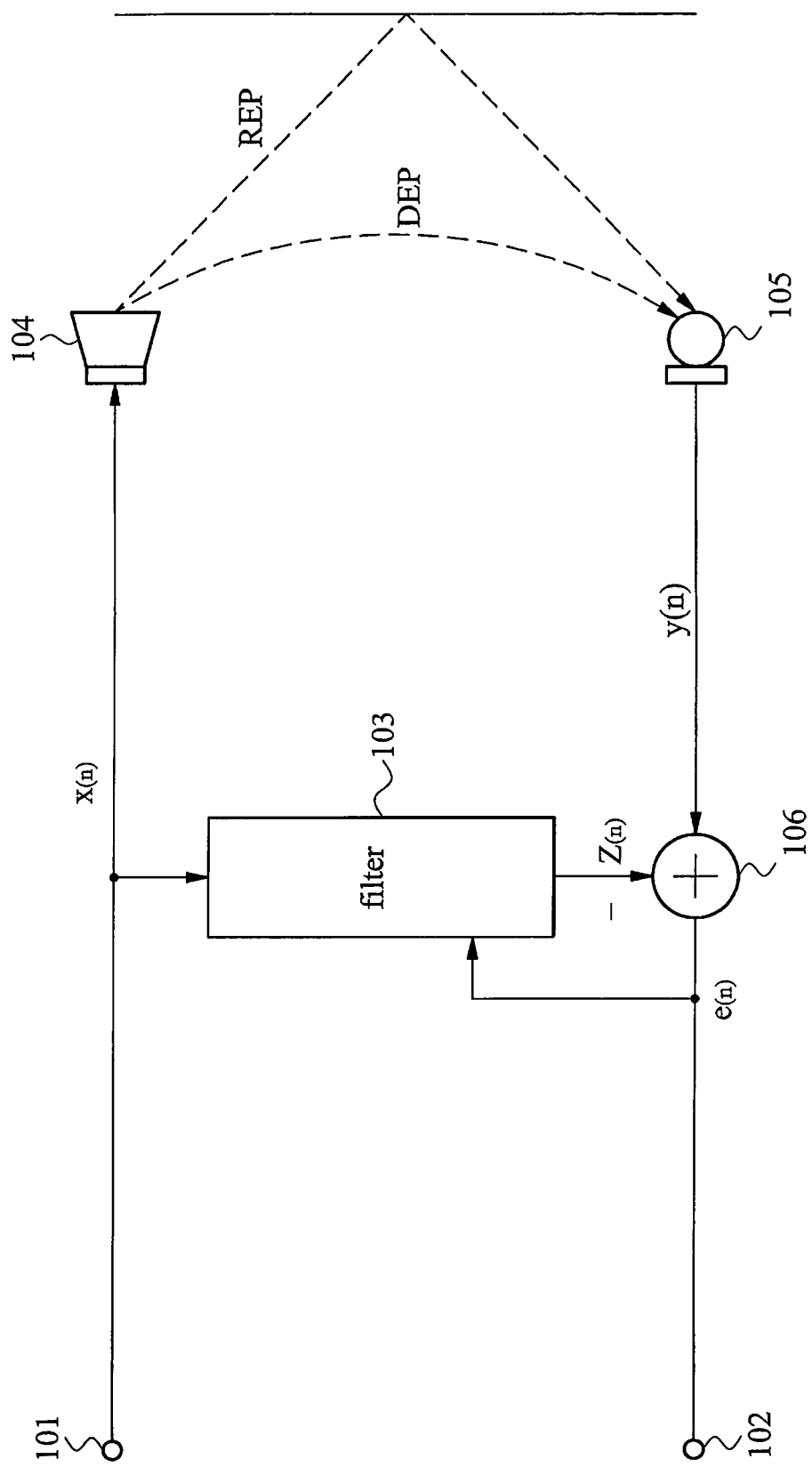
FIG. 1 shows a block diagram of a conventional system for implementing Acoustic Echo Cancellation (AEC).
Figure 2:
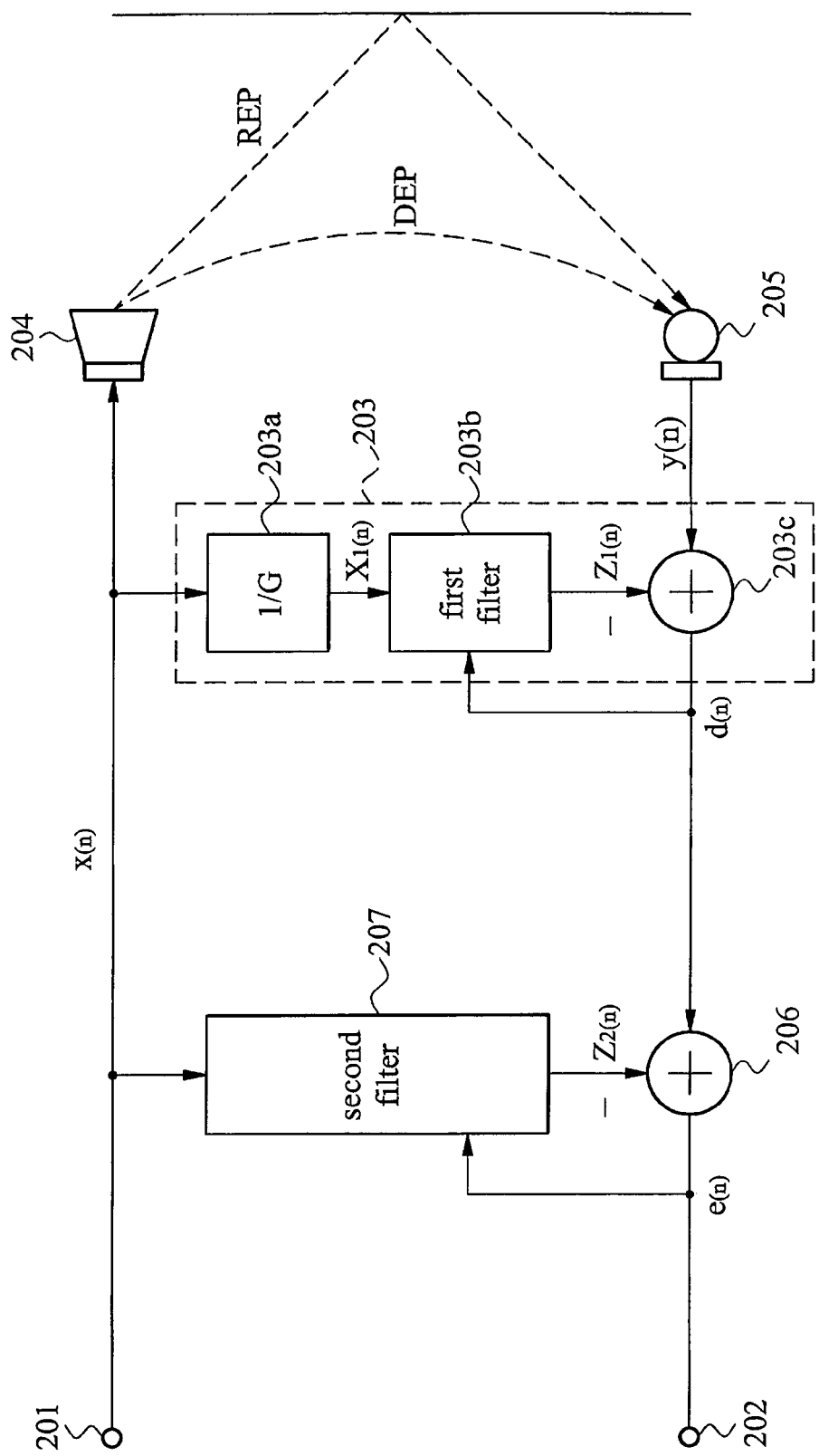
FIG. 2 shows a block diagram of an embodiment of the acoustic echo cancellation system according to the invention.

FIG. 2 shows a block diagram of an embodiment of the acoustic echo cancellation system according to the invention. The received signal x(n) is supplied via the input 201, and, in turn, transmitted to loudspeaker 204, echo cancellation unit 203 and the second filter 207. The echo cancellation unit 203 comprises an attenuator 203a, the first filter 203b and the first subtractor 203c. The attenuator 203a applies a down-scaling factor 1/G to signal x(n), where G is a positive number greater than 1, and generates an attenuated signal $x_1(n)$. Given the signal x(n) is represented digitally in finite precision, the attenuated signal $x_1(n)$ keeps the most significant bits (MSB) of x(n) which contributes the most significant part to the received echo signal from the microphone 205. The echo cancellation unit 203 is thus deemed to cancel the largest portion of echo contained in the input signal y(n) from the microphone 205.

The echo cancellation unit 203 generates a first echo signal estimate $z_1(n)$ to remove the unwanted portion from the signal y(n). The first filter 203b receives the attenuated signal $x_1(n)$ to generate the first simulated echo signal $z_1(n)$ to be subtracted from the microphone signal y(n). The filter 203b learns the echo path impulse response by using an adaptive algorithm based on a feedback signal d(n).

The first filter 203b is a linear adaptive filter commonly realized by a finite impulse response (FIR) filter with coefficients expressed as:

$$H(n) = [h_0(n), h_1(n), \ldots, h_{N_1-1}(n)]^T \quad (1),$$

wherein n is the discrete time index and $N_1$ is the length of the filter. The signal x(n) is output to the loudspeaker 204 which then goes through the room impulse response and then gets picked up by the microphone 205 as echo. The first echo estimate is generated from the first filter 203b convolved with $x_1(n)$:

$$z_1(n) = \sum_{k=0}^{N_1-1} h_k(n) x_1(n-k). \quad (2)$$

Echo cancellation is then achieved by subtracting the first echo signal estimate $z_1(n)$ from the signal y(n) picked up by the microphone 205 via the subtractor 203c. This process can be expressed by:

$$d(n) = y(n) - z_1(n) \quad (3).$$

Note that the first filter 203b needs to be adaptive in order to learn the echo path impulse response and then use it to simulate the echo path for echo cancellation. This adaptation is often called training or learning, and can be achieved by using commonly used adaptive algorithms such as the Least Mean Square (LMS) algorithm. Choosing of the adaptive algorithm is beyond the scope of this invention and no details will be given in this embodiment.

In the echo cancellation unit 203, the input digital signal $x_1(n)$ loses some Least Significant Bits (LSB) of x(n) as a result of the attenuation and therefore needs fewer data bits to be represented in a fixed-point processor. The filter coefficients H(n) then gains more bits or precision for representing the echo path impulse response to generate the echo signal estimate via the FIR filtering operation shown in Eq (2).

After the processing by echo cancellation unit 203, large portions of echo are cancelled from the signal y(n). However, there are still some echo signal components with small amplitude reside in d(n), the output of the echo cancellation unit 203. This residual echo is mainly caused by discarding some LSB of x(n) in the echo cancellation unit 203 during the attenuation operation, and may also be the consequence of the saturations still exist when sustained passage of large magnitude inputs and echo signals occur. Therefore, a second filter 207 is applied to cancel the residual echo from the signal d(n).

The second filter 207 can be a linear or nonlinear filter. The simplest realization is a linear FIR filter. Its coefficients can be expressed by:

$$G(n) = [g_0(n), g_1(n), \ldots, g_{N_2-1}(n)] \quad (4),$$

wherein n is the discrete time index and $N_2$ is the length of the filter. The coefficient set G(n) is deemed to approximate the impulse response of an equivalent echo path associated with the residual echo in d(n). This echo path does not represent the total room echo path impulse response but an equivalent portion of it associated with the residual echo in d(n). The second echo estimate $z_2(n)$ can be generated by the second filter 207 as follows:

$$z_2(n) = \sum_{k=0}^{N_2-1} g_k(n) x(n-k). \quad (5)$$

Echo cancellation is then achieved by subtracting the second simulated echo signal $z_2(n)$ from the signal d(n) via the subtractor 206. The result can be expressed by:

$$e(n) = d(n) - z_2(n) \quad (6).$$

The second filter 207 also needs to be adaptive so that the coefficients in G(n) will be trained to approach the impulse response of an equivalent echo path associated with the residual echo appearing in the signal d(n). The use of the adaptive algorithms for the second filter 207 will not be addressed in this embodiment. It may not be the same algorithm as used by the first filter 203b.

The final echo-cancelled signal e(n) is then transmitted to the output 202 after implementing the echo cancellation unit 203, the second filter 207 and the subtractor 206.

Figure 3:
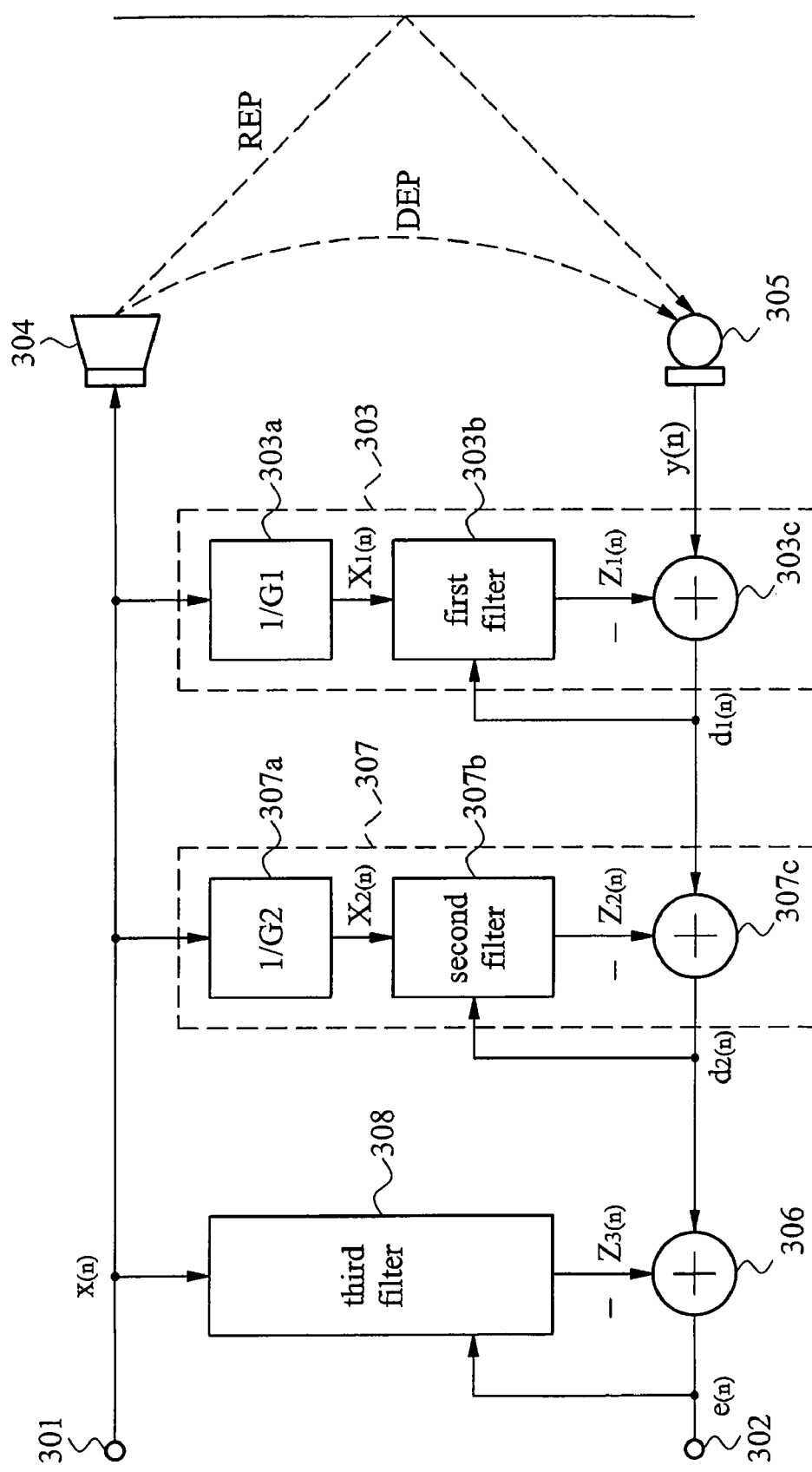
FIG. 3 shows a block diagram of another embodiment of the acoustic echo cancellation system according to the invention.

FIG. 3 shows a block diagram of another embodiment of the acoustic echo cancellation system according to the invention. Compared with the system shown in FIG. 2, a second echo cancellation unit is applied to enhance the efficiency of echo cancellation. The received signal x(n) is supplied via the input 301, and, in turn, transmitted to a loudspeaker 304, a first echo cancellation unit 303, a second echo cancellation unit 307 and a third filter 308. The first echo cancellation unit 303 comprises a first attenuator 303a, a first filter 303b and a subtractor 303c. The first attenuator 303a applies a down-scaling factor $1/G_1$ to signal x(n), where $G_1$ is a positive number greater than 1, and generates an attenuated signal $x_1(n)$.

The first echo cancellation unit 303 generates a first echo signal estimate $z_1(n)$ to remove the unwanted portion from the signal $y(n)$. The first filter 303b receives the attenuated signal $x_1(n)$ to generate the first echo signal estimate $z_1(n)$ to be subtracted from the microphone signal $y(n)$. The first filter 303b learns the echo path impulse response by using an adaptive algorithm based on a feedback signal $d_1(n)$.

The first filter 303b is a linear adaptive filter commonly realized by a finite impulse response (FIR) filter with coefficients expressed as:

$$H_1(n) = [h_{1,0}(n), h_{1,1}(n), \ldots, h_{1,N_1-1}(n)]^T \qquad (7),$$

wherein n is the discrete time index and $N_1$ is the length of the first filter 303b. The signal $x(n)$ is output to the loudspeaker 304 which then goes through the room impulse response and then gets picked up by the microphone 305 as echo. The first echo estimate is generated from the first filter 303b convolved with $x_1(n)$:

$$z_1(n) = \sum_{k=0}^{N_1-1} h_{1,k}(n) x_1(n-k). \qquad (8)$$

Echo cancellation is then achieved by subtracting the first simulated echo signal $z_1(n)$ from the signal $y(n)$ picked up by the microphone 305 via the subtractor 303c. The result can be expressed as:

$$d_1(n) = y(n) - z_1(n) \qquad (9).$$

The second echo cancellation unit 307 comprises a second attenuator 307a, a second filter 307b and a second subtractor 307c. The second attenuator 307a applies a down-scaling factor $1/G_2$ to signal $x(n)$, where $G_2$ is a positive number greater than 1, and generates an attenuated signal $x_2(n)$.

The second echo cancellation unit 307 generates a second echo signal estimate $z_2(n)$ to remove the residual echo portion from the signal $d_1(n)$. The second filter 307b receives the attenuated signal $x_2(n)$ to generate the second echo signal estimate $z_2(n)$, and adjusts the attenuated signal $x_2(n)$ based on a feedback signal $d_2(n)$.

The second filter 307b is a linear adaptive filter commonly realized by a finite impulse response (FIR) filter with coefficients expressed as:

$$H_2(n) = [h_{2,0}(n), h_{2,1}(n), \ldots, h_{2,N_2-1}(n)]^T \qquad (10),$$

wherein n is the discrete time index and $N_2$ is the length of the second filter 307b. The second echo signal estimate $z_2(n)$ is generated from the second filter 307b convolved with $x_2(n)$:

$$z_2(n) = \sum_{k=0}^{N_2-1} h_{2,k}(n) x_2(n-k). \qquad (11)$$

Echo cancellation is then achieved by subtracting the second echo signal estimate $z_2(n)$ from the signal $d_1(n)$ via the subtractor 307c. The result can be expressed by:

$$d_2(n) = d_1(n) - z_2(n) \qquad (12).$$

Note that both the first filter 303b and the second filter 307b need to be adaptive. The adaptation can be achieved with commonly used algorithms such as Least Mean Squares (LMS).

Note also that the length of the first filter 303b is generally different from the length of the second filter 307b. In this embodiment, $N_2$ is preferred to be selected smaller than $N_1$.

Furthermore, the value of $G_1$ in the first attenuator 303a is typically selected to be greater than the value of $G_2$ in the second attenuator 307a.

After processing of the first echo cancellation unit 303 and the second echo cancellation unit 307, large portions of echo are cancelled from the signal $y(n)$. However, there are still some residual echo in the signal $d_2(n)$ due to the data precision loss of signals $x_1(n)$ and $x_2(n)$ compared to the original received signal $x(n)$, the loses in precision of data representation results in the echoes in the small signal component not being cancelled. A third filter 208 is, thus, employed to estimate this residual echo and cancel it from the signal $d_2(n)$.

The third filter 308 can be a linear or nonlinear filter. The simplest realization is a linear FIR filter. Its coefficients can be expressed by:

$$G(n) = [g_0(n), g_1(n), \ldots, g_{N_3-1}(n)]^T \qquad (13),$$

wherein n is the discrete time index and $N_3$ is the length of the filter. The coefficient set $G(n)$ is deemed to approximate the impulse response of an equivalent echo path associated with the residual echo in the signal $d_2(n)$. The third echo signal estimate $z_3(n)$ can be generated by the third filter 308 as expressed by:

$$z_3(n) = \sum_{k=0}^{N_3-1} g_k(n) x(n-k). \qquad (14)$$

Echo cancellation is then achieved by subtracting the third echo signal estimate $z_3(n)$ from the signal $d_2(n)$ via the subtractor 306. The result can be expressed by:

$$e(n) = d_2(n) - z_3(n) \qquad (15).$$

The third filter 308 needs also to be adaptive so that the coefficients in $G(n)$ are trained to approach the impulse response of an equivalent echo path associated with the residual echo appearing in the signal $d_2(n)$. The use of the adaptive algorithms for the third filter 308 is not addressed in this embodiment. It is not necessary to use the same algorithm used by the first filter 303b or the second filter 307b.

The final echo-cancelled signal $e(n)$ is then transmitted to the output 302 from the subtractor 306 after implementing the first echo cancellation unit 303, the second echo cancellation unit 307 and the third filter 308.

Figure 4:
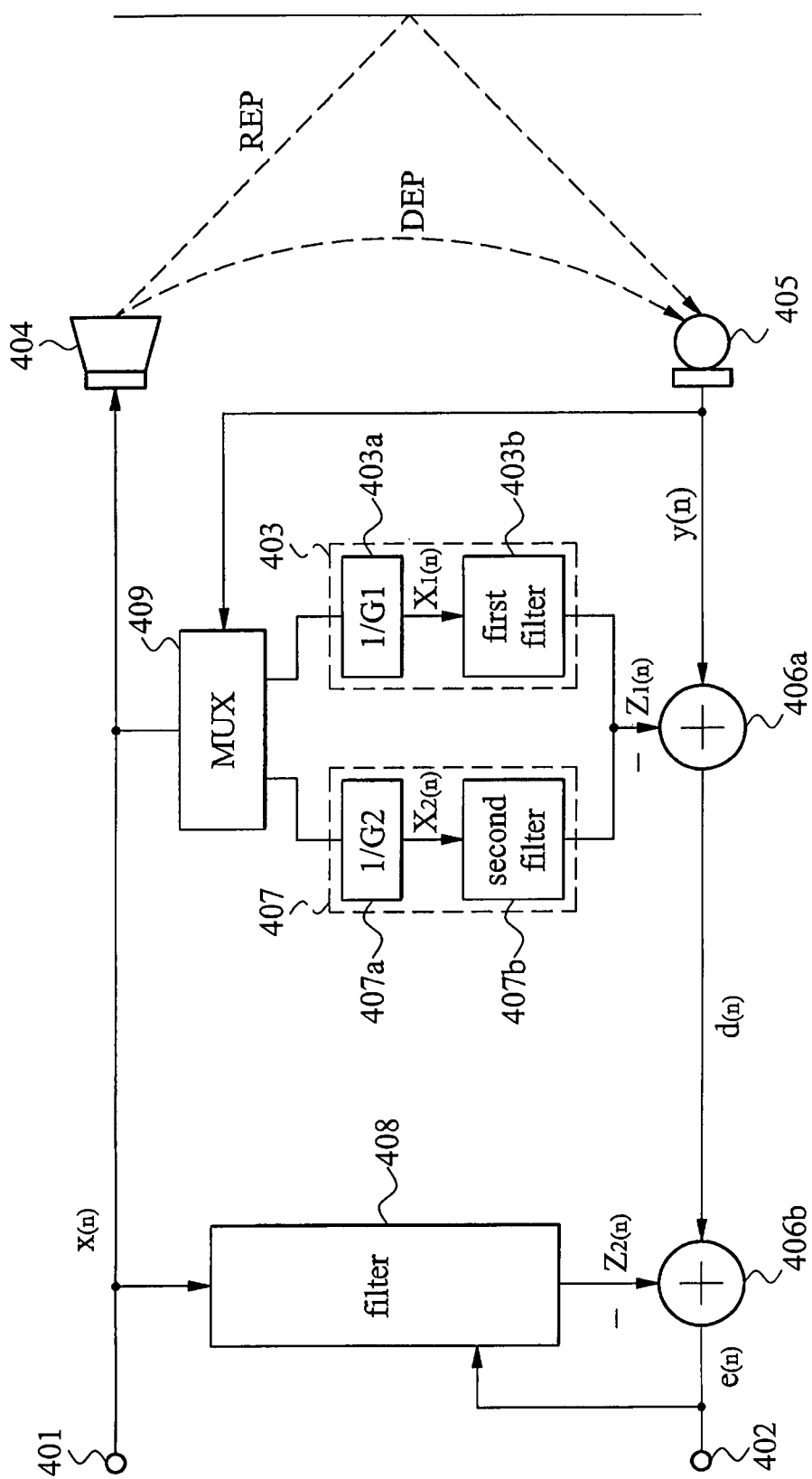
FIG. 4 shows a block diagram of another embodiment of the acoustic echo cancellation system according to the invention.

FIG. 4 shows a block diagram of another embodiment of the acoustic echo cancellation system according to the invention. In this embodiment, the acoustic echo cancellation system uses one of the two adaptive filters to remove the echo portions from the input signal $y(n)$. Only one filter will be activated at one time period and the multiplexer 409 selects the active one based on the input signal $y(n)$.

The first echo estimation unit 403 and second echo estimation unit 407 include a first attenuator 403a and a second attenuator 407a with different down-scaling factors, respectively. After the signal $x(n)$ has been attenuated respectively in each unit, the signal $x(n)$ is transmitted to a corresponding filter to generate the simulated echo signal $z_1(n)$.

The first echo estimation unit 403 comprises first attenuator 403a and the first filter 403b. The first attenuator 403a applies a down-scaling factor $1/G_1$ to signal $x(n)$, where $G_1$ is a positive number greater than 1, and generates an attenuated signal $x_1(n)$.

The first filter 403b is realized by a finite impulse response (FIR) filter with coefficients expressed as:

$$H(n) = [h_0(n), h_1(n), \ldots, h_{N_1-1}(n)]^T \qquad (16),$$

wherein n is the discrete time index and $N_1$ is the length of the first filter 403b. The first echo signal estimate $z_1(n)$ is generated from the filtering output of the first filter 403b given as:

$$z_1(n) = \sum_{k=0}^{N_1-1} h_k(n)x_1(n-k). \tag{17}$$

Echo cancellation is then achieved by subtracting the first simulated echo signal $z_1(n)$ from the signal $y(n)$ via the subtractor 406a. The result can be expressed as:

$$d(n)=y(n)-z_1(n) \tag{18}$$

The above gives a description on using the first echo estimation unit 403 for removing the echo from the signal $y(n)$. If the multiplexer 409 selects the second echo estimation unit 407, a similar operation will be executed. Detailed description is omitted here for simplicity.

The filter 408 can be a linear or nonlinear filter. The simplest realization is a linear FIR filter. Its coefficients can be expressed by:

$$G(n)=[g_0(n),g_1(n),\ldots,g_{N-1}(n)]^T \tag{19},$$

wherein n is the discrete time index and N is the length of the filter. The coefficient set $G(n)$ is deemed to approximate the impulse response of an equivalent echo path associated with the residual echo in the signal $d(n)$. The second echo signal estimate $z_2(n)$ can be generated by the second filter 408 as expressed by:

$$z_2(n) = \sum_{k=0}^{N-1} g_k(n)x(n-k). \tag{20}$$

Echo cancellation is then achieved by subtracting the second simulated echo signal $z_2(n)$ from the signal $d(n)$ via the subtractor 406b. The result is given as:

$$e(n)=d(n)-z_2(n) \tag{21}.$$

The filter 408 needs to be adaptive such that its coefficient $G(n)$ can be trained to estimate the impulse response of an equivalent echo path associated with the residual echo appearing in the signal $d(n)$.

The final echo-cancelled signal $e(n)$ is then transmitted to the output 402 from the subtractor 406b after implementing the filter 403 and 407 for the first echo estimator and the filter 408 for the residual echo estimator.

Figure 5:
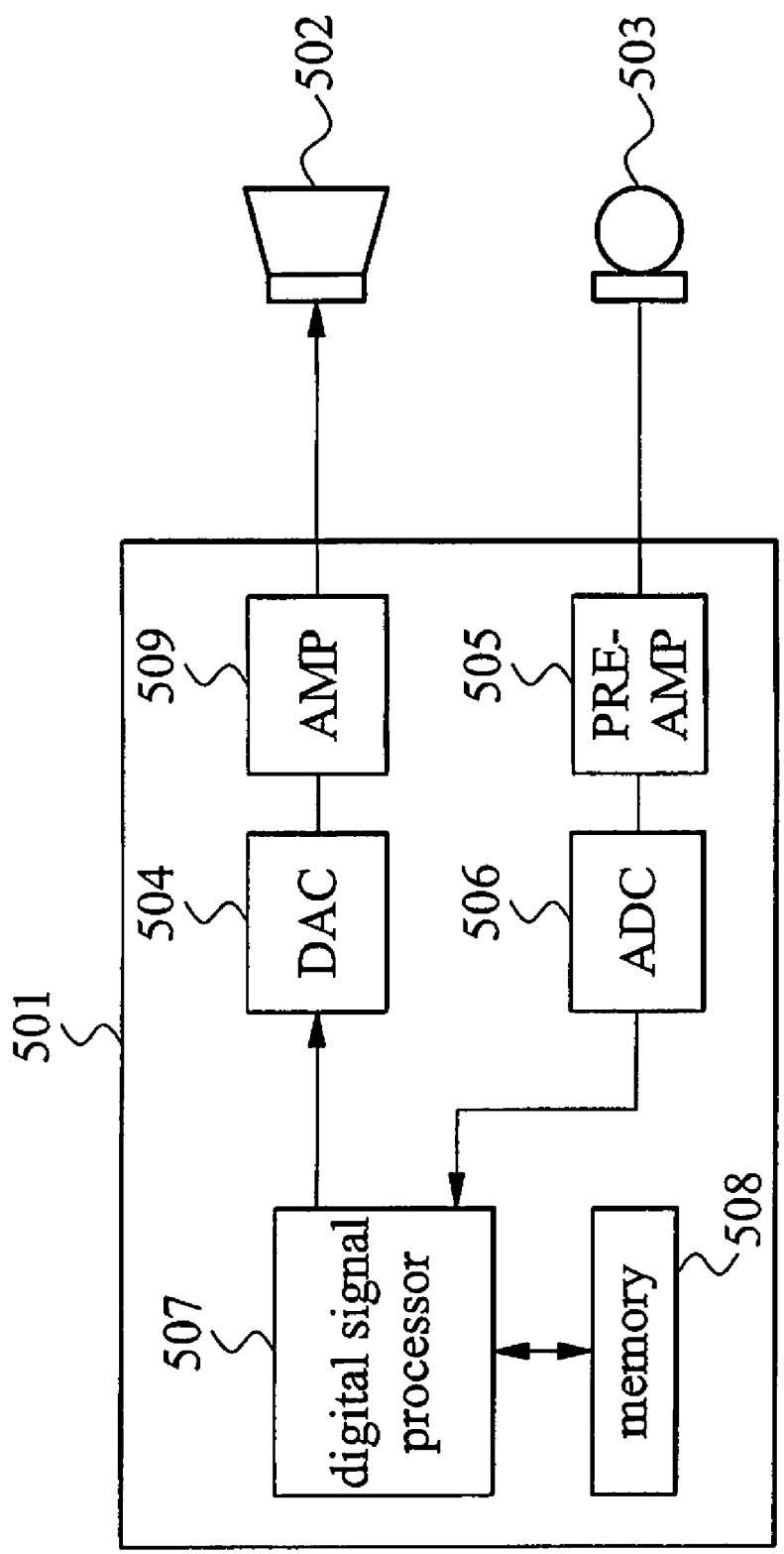
FIG. 5 shows a block diagram of another embodiment of the acoustic echo cancellation system according to the invention.

FIG. 5 is a block diagram of another embodiment of the acoustic echo cancellation system according to the invention. The echo cancellation system 501 comprises a digital signal processor 507, digital-to-analog converter (DAC) 504, analog-to-digital converter (ADC) 506, pre-amplifier 505, amplifier 509 and memory 508. The digital signal processor 507 comprises the architecture, such as those shown in FIGS. 2-4. The coefficients of the required filter, the temporary data generated during the filter operation or other data required for the filter operation are stored in the memory 508. The DAC 504 performs digital-to-analog conversion on the received signal, so that the loudspeaker 502 can play the received signal. After the digital-to-analog conversion by the DAC 504, the output analog signal is first amplified by the amplifier 509 and then transmitted to the loudspeaker 502. The acoustic signal acquired by the microphone 503 is first amplified by the pre-amplifier 505 and then converted by the ADC 506 for further signal processing. Please refer to the descriptions of FIGS. 2-4 for details on the operation. In the present application, the acoustic echo cancellation system shown in FIGS. 2-5 can be applied to phone systems, and especially to hand-free phone systems.

Figure 6:
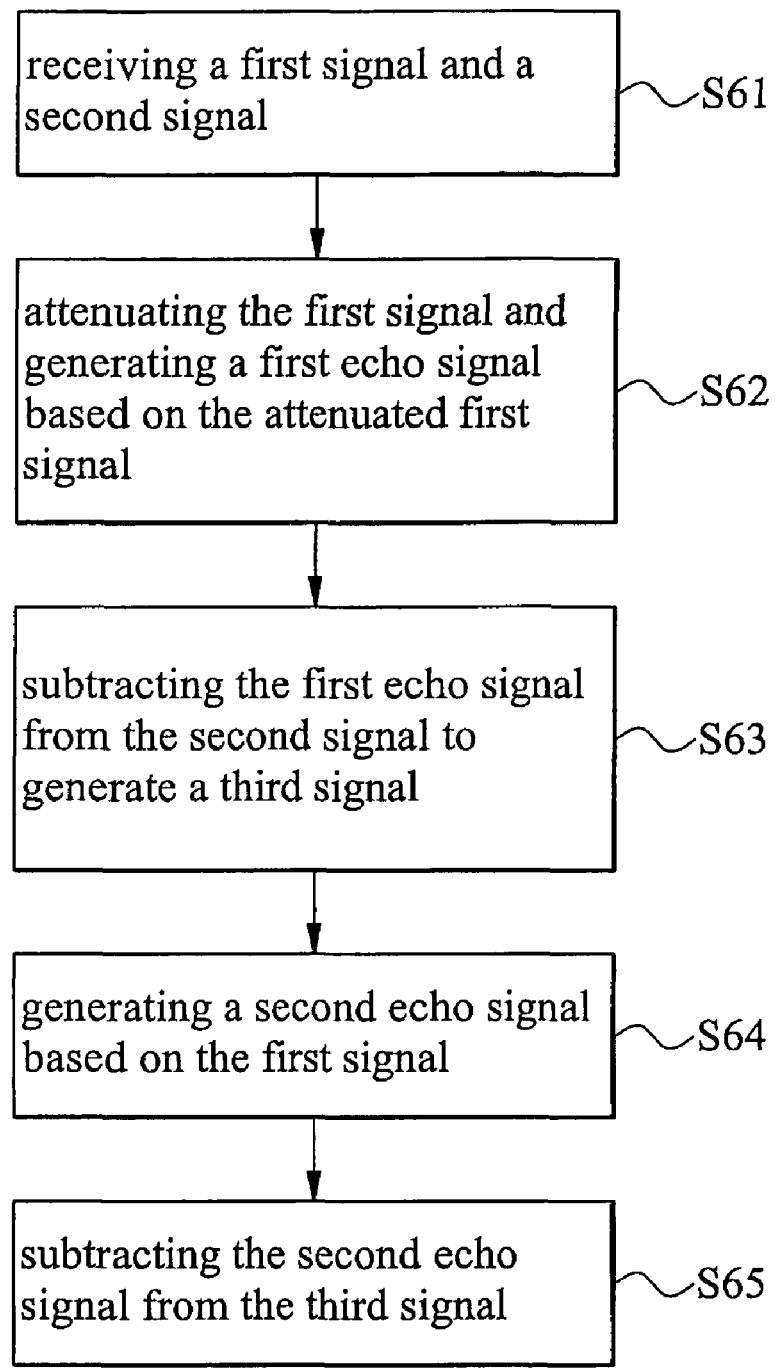
FIG. 6 is a flowchart of an embodiment of the acoustic echo cancellation method according to the invention.

FIG. 6 is a flowchart of an embodiment of the acoustic echo cancellation method according to the invention. In the step S61, the first signal and the second signal are received, wherein the first signal is transmitted to a loudspeaker for playing out, the second signal is acquired by a microphone that contains the echo interference portions caused by the first signal. In the step S62, the first signal is attenuated and a first echo signal estimate is generated from the attenuated first signal using a FIR filter. In the step S63, the first echo signal estimate is removed from the second signal via a subtractor to generate a third signal. In the step S64, a second echo signal estimate is generated from the first signal using a FIR filter. In the step S65, the second echo signal estimate is removed from the third signal via a subtractor to generate the final echo-cancelled signal for transmission.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An acoustic echo cancellation system, comprising: a first echo cancellation unit, comprising: a first attenuator, having a first down-scaling factor, for attenuating a first signal;
   a first filter to generate a first echo signal estimate based on the attenuated first signal; and
   a first subtractor to generate a third signal by subtracting the first echo signal estimate from a second signal;
   a second echo cancellation unit, comprising:
   a second attenuator, having a second down-scaling factor, for attenuating the first signal; and
   a second filter to generate a second echo signal estimate based on the output signal of the second attenuator, wherein the second down-scaling factor is different from the first down-scaling factor; and
   a second subtractor to generate a fourth signal by subtracting the second echo signal estimate from the third signal;
   a third filter to generate a third echo signal estimate based on the first signal; and
   a third subtractor subtracting the third echo signal estimate from the fourth third signal.

2. The system as claimed in claim 1, wherein the first echo cancellation unit is further coupled to a memory storing a plurality of coefficients of the first filter, and the first filter selects corresponding coefficients based on the signal from the third subtractor.

3. The system as claimed in claim 1, further comprising a memory, coupled to the third filter, storing a plurality of coefficients of the third filter, wherein the third filter selects corresponding coefficients based on the signal from the third subtractor.

4. The system as claimed in claim 1, wherein the first filter, the third filter and the second filter are the adaptive FIR filters.

5. An acoustic echo cancellation system, comprising:
   a first attenuator, having a first down-scaling factor, for attenuating a first signal;
   a first filter to, generate a first echo signal estimate based on the attenuated first signal;

a second attenuator, having a second down-scaling factor, for attenuating the first signal, wherein the second down-scaling factor is different from the first down-scaling factor;
a second filter to generate a second echo signal estimate based on the output signal of the second attenuator;
a first subtractor to, generate a third signal by subtracting the first echo signal estimate or the second echo signal estimate from a second signal; and
a multiplexer coupled to the first attenuator and the second attenuator, transmitting the first signal to the first filter or the second filter based on a control signal;
a third filter to, generate a third echo signal estimate based on the first signal; and a second subtractor subtracting the third echo signal estimate from the third signal.

6. The system as claimed in claim 5, wherein the first filter and the second filter are fixed finite impulse response filter.

7. The system as claimed in claim 5, wherein the control signal is determined based on the strength of echo signals caused by the first signal.

8. An apparatus with an acoustic echo cancellation system, comprising:
a loudspeaker receiving and playing a first signal;
a microphone acquiring a second signal;
a first echo cancellation unit, comprising:
a first attenuator, having a first down-scaling factor, for attenuating a first signal;
a first filter to generate a first echo signal estimate based on the attenuated first signal; and
a first subtractor to generate a third signal by subtracting the first echo signal estimate from a second signal;
a second echo cancellation unit, comprising:
a second attenuator, having a second down-scaling factor, for attenuating the first signal; and
a second filter to, generate a second echo signal estimate based on the output signal of the second attenuator, wherein the second down-scaling factor is different from the first down-scaling factor; and
a second subtractor to, generate a fourth signal by subtracting the second echo signal estimate from the third signal;
a third filter to generate a third echo signal estimate based on the first signal; and
a third subtractor subtracting the third echo signal estimate from the fourth signal.

9. The apparatus as claimed in claim 8, further comprising:
a digital-to-analog converter for converting the first signal to an acoustic signal and transmitting the acoustic signal to the loudspeaker for playing; and
an analog-to-digital converter for converting the acoustic signal acquired by the microphone to the second signal.

10. The apparatus as claimed in claim 8, wherein the first echo cancellation unit is further coupled to a memory storing a plurality of coefficients of the first filter, and the first filter selects corresponding coefficients based on the signal from the third subtractor.

11. The apparatus as claimed in claim 8, further comprising a memory, coupled to the third filter, storing a plurality of coefficients of the third filter, wherein the third filter selects corresponding coefficients based on the signal from the third subtractor.

12. The apparatus as claimed in claim 8, wherein the first filter, the third filter and the second filter are each an adaptive FIR filter.

13. An apparatus with an acoustic echo cancellation system, comprising:
a loudspeaker receiving and playing a first signal;
a microphone acquiring a second signal;
a first attenuator, having a first down-scaling factor, for attenuating a first signal;
a first filter to, generate a first echo signal estimate based on the attenuated first
a second attenuator, having a second down-scaling factor, for attenuating the first signal, wherein the second down-scaling factor is different from the first down-scaling factor;
a second filter to generate a second echo signal based on the output signal of the second attenuator;
a first subtractor to, generate a third signal by subtracting the first echo signal estimate or the second echo signal estimate from a second signal; and
a multiplexer coupled to the first attenuator and the second attenuator, transmitting the first signal to the first filter or the second filter based on a control signal;
a third filter to, generate a third echo signal estimate based on the first signal; and a second subtractor subtracting the third echo signal estimate from the third signal.

14. The apparatus as claimed in claim 13, wherein the first filter and the second filter are each a fixed finite impulse response filter.

15. The apparatus as claimed in claim 13, wherein the control signal is determined based on the strength of echo signals caused by the first signal.

* * * * *